United States Patent [19]

Komodromos et al.

[11] 4,185,967
[45] Jan. 29, 1980

[54] PROCESS FOR THE PRODUCTION OF METHANE-CONTAINING GASES AND CATALYST USED IN PROCESS

[75] Inventors: Costa Komodromos, London; Alan Williams, Shirley; Norman Parkyns, London, all of England

[73] Assignee: British Gas Corporation, London, United Kingdom

[21] Appl. No.: 878,089

[22] Filed: Feb. 15, 1978

[30] Foreign Application Priority Data

Feb. 18, 1977 [GB] United Kingdom ............... 06908/77

[51] Int. Cl.$^2$ ..................... B01J 21/04; B01J 23/86; C01B 2/16
[52] U.S. Cl. ................................... 48/214 A; 252/465
[58] Field of Search ................. 252/465, 373; 48/213, 48/214 A, 214 R

[56] References Cited

U.S. PATENT DOCUMENTS

| | | | |
|---|---|---|---|
| 3,418,093 | 12/1968 | Davies | 48/214 A |
| 3,423,194 | 1/1969 | Kearby | 48/214 A |
| 3,950,368 | 4/1976 | Broecker et al. | 252/466 J |
| 3,990,866 | 11/1976 | Broecker et al. | 48/214 A |
| 4,046,869 | 9/1977 | Dorawala et al. | 48/214 R |

FOREIGN PATENT DOCUMENTS 1342020 12/1973 United Kingdom .

*Primary Examiner*—W. J. Shine
*Attorney, Agent, or Firm*—Watson, Cole, Grindle & Watson

[57] ABSTRACT

Steam reforming catalysts which are suitable for the gasification of hydrocarbons, particularly heavier hydrocarbons such as kerosene and gas oils, consist of calcined and reduced forms of a basic mixed carbonate of nickel, aluminium and chromium produced by coprecipitation. The catalysts are further characterized in that they have a pore size distribution such that at least 55% by volume of the pores of the calcined but unreduced catalyst which have a pore radius of 12–120A is in the range 12–30A. The catalysts are produced by coprecipitation, preferably at temperatures of not more than 60° C., by using an alkali carbonate as the precipitant and by adding the precipitant to a mixed solution of aluminum, nickel and chromium III compounds. The catalysts which have good sinter and polymer resistance may be used for the production of methane-containing gases, e.g., for the production of substitute natural gas.

14 Claims, 2 Drawing Figures

PROCESS FOR THE PRODUCTION OF METHANE-CONTAINING GASES AND CATALYST USED IN PROCESS

BACKGROUND OF THE INVENTION

1. Field of the Invention

This invention relates to the catalytic steam reforming of hydrocarbons in the production of methane-containing gases, such as Substitute Natural Gas and to catalysts for use in such steam reforming operations. More particularly, the invention relates to the catalytic steam reforming of the heavier hydrocarbon factions and to new catalysts for use in such steam reforming.

2. Description of the Prior Art

The catalytic steam reforming of hydrocarbons for the production of methane-containing gases, such as Town Gas or Substitute Natural Gas (SNG), has been known for many years. For example, in our prior U.K. Patent Specification No. 820,257 there is described and claimed a process for the production of methane-rich gases wherein steam and hydrocarbons are reacted in the presence of a catalyst comprising nickel and alumina to produce a methane-rich gas.

This catalytic steam reforming process has been further developed as described, for example, in our U.K. Patent Specification Nos. 969,637, 994,278, 1,152,009, 1,150,066, 1,155,843 and 1,265,481. However, although these modified processes are themselves very efficient, the governing constraint is the problem of maintaining catalyst life under the reforming conditions.

It has been recognised that such catalysts may be subjected to sintering at high temperatures. The sintering process is characterised by a decrease in both metal and total surface area and results in a loss of catalytic activity. The effect of steam on the sintering of alumina-based catalysts during the steam reforming of hydrocarbons has been reported in "Journal of Catalysis," Vol. 24, 2 Feb. 1972, pages 352–355. Sintering in the presence of steam is much more rapid at comparable temperatures than in air, and a different mechanism is probably involved.

It has been suggested that the vital step in the sintering process is the conversion of the metastable γ-alumina support, which has a relatively high surface area, into the more stable α-alumina form (corundum), having a very low surface area. It has been observed that particles of γ-alumina begin to grow during catalyst operation. For example, after a sintering test in steam at 600° C. the crystallite size of the γ-alumina is typically 90–120 Å, whereas immediately after reduction of the catalyst, the crystallite size is in the range of 60–70 Å. At the same time, some growth of the nickel particles occurs. It is, however, predominantly the conversion of γ to α-alumina which causes massive changes in the structure of the catalyst and triggers the irreversible deactivation of the catalyst.

Examination of used coprecipitated nickel-alumina catalysts shows that the α-alumina particles formed are over 1000 Å in size. Hence, the formation of a single α-alumina particle required many γ-alumina ones and must involve macroscopic rearrangement of the structure of the catalyst. The alumina particles are then no longer able to keep the nickel crystallites apart. Serious nickel sintering is therefore triggered by the start of corundum formation.

In other alumina systems, it has been recognised that thermal sintering may be prevented by the addition of other metals to the alumina lattice. The γ to α-alumina phase change involves the conversion of the cubic close packed oxygen ions of the spinel-like γ-structure into the hexagonal close packed array of α-alumina. In pure alumina, the conversion occurs thermally at about 1000° C. Many studies have been undertaken to investigate the effect of small concentrations of other metal ions upon the temperature and rate of γ to α-alumina phase change and one has been to study the effect of chromium on the rate of formation of α-alumina at 1100° C. (G. C. Bye and G. T. Simkin, J. Am. Cer. Soc. 57, (8), 367, (1974)). These workers have concluded that from 2 to 4% weight additions of chromium decreases the rate of conversion at that temperature and that the linear relationship between the surface area loss and the α-alumina formation is only slightly affected by the addition.

SUMMARY OF THE INVENTION

We have surprisingly found that the resistance of coprecipitated nickel-alumina to steam sintering (as opposed to thermal sintering) can be increased by the substitution of not less than 10% of the aluminium atoms by those of chromium, and that not only the sinter resistance but also the polymer deactivation resistance of such nickel-alumina systems can be considerably improved simultaneously by employing catalysts wherein not less than 10% of the aluminium is substituted by chromium.

Catalysts containing coprecipitated nickel, alumina and chromia are already known. In United Kingdom Patent Specification No. 1,342,020 there are described finely divided homogeneous catalysts, which are prepared by coprecipitating the basic carbonate complexed of the active metals under alkaline conditions, using an alkali bicarbonate as the precipitating agent. The catalysts exemplified are produced by adding a hot solution (about 90° C.) of a mixture of salts, usually nitrates, of the active metals to a solution of the bicarbonate at the same temperature. Thus the precipitating environment is always maintained under alkaline pH conditions, which favor the production of highly crystalline homogeneous products. Example 26 of U.K. Patent Specification No. 1,342,020 specifically describes the production of a Ni-Al-Cr(III) catalyst system for use in the conversion of nitrobenzene to aniline in which the chromium is stated to be present as a recrystallisation inhibitor. As can be seen from the X-ray analysis of the oxidic precursor, the material is a highly ordered crystalline material.

We have found that Ni-Al-Cr catalysts of essentially the same empirical formula as those described in U.K. Patent Specification No. 1,342,020, but differing considerably as regards their crystalline structure, are especially useful in the steam reforming of hydrocarbons, particularly the heavier hydrocarbons. Furthermore, chromium plays an essential role both in affecting the crystallinity of the catalyst and in maintaining good catalyst life under steam reforming conditions, i.e., when compared with the conventional coprecipitated nickel-alumina catalysts hitherto used for steam reforming.

The catalysts of the invention are characterised in that their crystallinity is not uniform and not high.

Thus, in accordance with the invention, there is provided catalysts suitable for the steam reforming of hydrocarbons consisting of the calcined and reduced form of a basic carbonate of the empirical formula $$Ni_aAl_bCr_cCO_3(OH)_{16}\cdot xH_2O$$

wherein,
a = 4–6.4,
the ratio of b/c is from 3 to 19:1,
2a + 3b + 3c = 18, and
x is from 3.5 to 5.5, and
wherein in the calcined but unreduced form at least 55% by volume of pores in the catalyst having a pore radius of 12–120 Å is in the range 12–30 Å. In a preferred form of the invention, the b/c ratio equals about 9:1.

In the preferred form, about one-tenth of the atoms of aluminium should be replaced by chromium (III).

The present invention also provides a process for the production of such catalysts, which process includes the steps of forming a basic mixed carbonate by coprecipitation from an aqueous solution containing a mixture of water-soluble compounds of nickel, aluminium and chromium (III), drying the precipitates, calcining the dried precipitate, and, prior to use as a catalyst, reducing the calcined product.

The catalysts of the invention may contain amounts of other metals or compounds, e.g., promoters, these amounts being those conventionally used in the field of catalysis, particularly catalytic steam reforming. Typically, the catalysts of the invention may have not more than 0.4%K and, although sodium is desirably absent, sodium levels of up to about 0.01% may be accepted, particularly if potassium is also present.

The catalysts of the present invention may be prepared by the constant temperature precipitation technique which is generally well known in the art of catalyst production. However, hitherto precipitation has been carried out at temperatures at, or near, 100° C. It has also, hitherto, been preferred to boil the precipitated product at completion of precipitation and to employ a falling temperature precipitation technique. In contrast with the known techniques, the catalysts of the present invention may be prepared with advantage by carrying out the precipitation at temperatures not greater than about 60° C., and more preferably at temperatures ranging from room temperature up to about 50° C., i.e., since this has a beneficial effect upon the pore size distribution. Preferably, the precipitation is carried out at a constant temperature. In addition, and in marked contrast to the teachings of U.K. Patent Specification No. 1,342,020, it is preferred to employ a basic carbonate, such as sodium or potassium carbonate, as the precipitant, and to add the carbonate solution to the metal salt solution. Under these circumstances precipitation takes place initially under acid conditions and ends under alkaline conditions. The use of carbonates and the method of effecting precipitation are believed to have an effect upon the pore size distribution of the calcined precursor. Post-precipitation treatment steps which are similar to those conventionally employed in the production of nickel-alumina catalysts and are described, for example, in our prior U.K. Patent Specification Nos. 969, 1,150,066 and 1,155,843 may be employed for the catalysts of the present invention. However, with the catalyst of the present invention it is preferred to carry out the washing and filtering of the precipitate at temperatures which are not greater than those at which the precipitation was effected. In any event, boiling of the catalyst precursor slurry is to be avoided. The catalyst may be dried in the shortest possible time consistent with the lowest practicable temperature (viz, to minimise heat treatment), and is preferably carried out at substantially the same temperature employed during the precipitation step.

The catalysts of the present invention are generally characterised by having greater densities than those coprecipitated catalysts prepared by other methods. This effect of greater density is due, in part, to the presence of chromium ions, and is also directly attributable to the method by which the catalysts are prepared.

The present invention, therefore, further provides a process for the production of methane containing gases, which process comprises passing the vapor of a hydrocarbon feedstock having a boiling point of not more than about 360° C. and steam over a bed of nickel-alumina-chromia catalyst as herein described, wherein the temperature at the inlet of the catalyst bed is from 350° to 650° C. and the temperature at the exit of the catalyst bed is at least 450° C.

The process of the present invention may be carried out at those temperatures and pressures conventionally used in the art of steam reforming to produce methane-containing gases. However, since the nickel-chromia-alumina catalysts have good sinter resistance, it is possible to employ higher preheat temperatures than those conventionally employed and, thus, the use of heavy feedstocks, for example kerosene and gas oil, requiring high preheats, can be gasified without running the risk of catalyst deactivation due to sintering. Naphtha can also be used as a feedstock. The feedstock to steam ratio employed in the gasification process may be that conventionally employed in the art of steam reforming. Typically the steam to feedstock ratio will be in excess of 1.5 to 1 (weight/weight).

The invention will be described with reference to the following Examples which in turn refer to the accompanying drawing.

EXAMPLE 1

Figure 1:
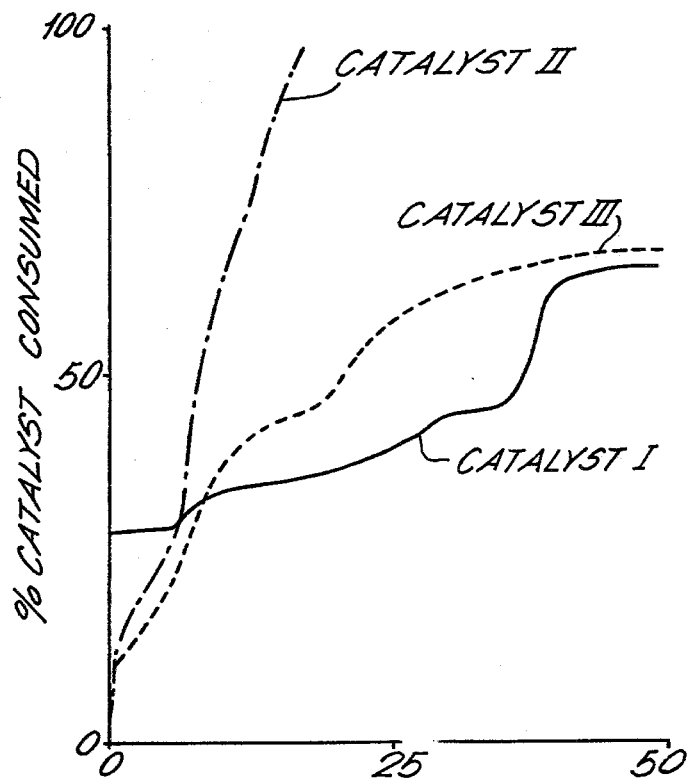
FIG. 1 shows the relationship of the amount of catalyst consumed vs. the amount of hydrocarbon feedstock (kerosene) consumed using various catalysts, including catalysts in accordance with the present invention.

Five catalyst precursors, A to E, were prepared each having the composition shown in Table 1 for the empirical formula $$Ni_6Al_xCr_yCO_3(OH)_{16}4H_2O$$

| Catalyst | Composition x | y |
|---|---|---|
| A | 2 | 0 |
| B | 1.9 | 0.1 |
| C | 1.2 | 0.8 |
| D | 1.8 | 0.2 |
| E* | 1.8 | 0.2 |

E* The sample contained 0.07 wt% potassium

The precursors were prepared by dissolving:

| Nickel Nitrate | (Ni(NO$_3$)$_2$ 6H$_2$O) | 2gm moles |
| --- | --- | --- |
| Aluminium Nitrate | (Al(NO$_3$)$_3$ 9H$_2$O) | x/3gm moles |
| Chromium Nitrate | (Cr(NO$_3$)$_3$ 9H$_2$O) | y/3gm moles | in 1400 ml of distilled water.

4 gm moles of anhydrous sodium carbonate was dissolved in 1100 ml of water.

Precipitation

The solution of nitrates was heated to 92° C., and the sodium carbonate solution was brought to a boil. The carbonate was slowly added into the nitrate and the mixture was vigorously stirred. The rate of carbonate addition and the rate of heating were adjusted so that a temperature of 91°–93° C. was maintained throughout the precipitation.

The carbonate was added over a period of 25 minutes, after which the slurry was brought to a boil and maintained at its boiling temperature for 15 minutes (whilst stirring).

The slurry was then transferred to a Buchner funnel and sucked dry on filter paper.

Washing and Drying

The blue-green mud was washed to remove sodium by re-slurrying it in 2 liters of distilled water and heating to 90° C., filtering on a Buchner funnel as before and repeating the process until the filtrate showed a pH value of around 6.5. Normally six washes are required. The washed mud was then stirred into a smooth paste and spread onto a stainless steel tray as a thin (⅛–¼") layer, and dried in a still air oven at 120° C. for 40 hours.

Calcination and Pelleting

The dried catalyst lumps were ground and sieved through a 850 μm mesh, then heated from room temperature to 450° C. in a muffle furnace. This temperature was maintained for 2 hours and warm up time was 30 minutes.

Thereafter the catalyst was pelleted on a Manesty single stroke tabletting machine to ⅛ in. equant cylinders, after addition of 2% wt. graphite as lubricant.

Catalysts B, C, D, E are catalysts of the invention, whereas Catalyst A is not: Catalyst A being of a standard nickel-alumina formulation with no chromium. Catalyst A was employed in the following tests for control and comparison purposes.

Steam Sintering Test

The catalysts were subjected to a steam sintering test, in which the sample is exposed to a flowing steam/hydrogen atmosphere (9:1 v/v mixture) for 270 hours at 600° C. and 365 psig pressure.

The examination of the catalysts has been carried out by the measurement by X-ray diffraction of the nickel crystallite size (and hence nickel area).

The results are shown in Table 2.

Table 2

| Catalyst | Nickel Crystallite Size A |
| --- | --- |
| A | 277 |
| B | 233 |
| C | 155 |
| D | 157 |
| E | 164 |

It will be apparent from the results given in Table 2 that Catalyst B has better sinter resistance than A and the Catalysts C, D, E have a far better resistance to sintering than either A or B Gasification Test The gasification tests were carried out under the following conditions:

| Pressure | 450 psig |
| --- | --- |
| Preheat | 450° C. |
| Feedstock | LDF 170 sp.gr. 0.72 |
| Steam/feedstock | 1.66:1 w/w |

The Catalysts tested were A, B and D.

The gasification tests showed that the chromium catalysts had a lower rate of deactivation than the conventional catalyst. The rate of deactivation is measured as the progression of the reaction temperature profile down the bed with time.

The results were:

| B | 0.9 Cr | 0.7 inch/100 hr |
| --- | --- | --- |
| D | 1.8 Cr | 0.6 " |
| A | 0 Cr | 1.2 " |

EXAMPLE 2

A catalyst precursor slurry was prepared from nickel nitrate, aluminium nitrate and chromic nitrate, with sodium carbonate as the precipitant.

The catalyst precursor had the empirical formula:

$$Ni_6Al_{1.5}Cr_{0.2}CO_3(OH)_{16}4H_2O$$ 

was prepared by dissolving 522 gm of hydrous nickel nitrate, 225 gm of hydrous aluminium nitrate and 26.6 gm of hydrous chromium III nitrate in 1400 ml of distilled, and separately 420 gm of anhydrous sodium carbonate in 1100 ml of distilled water.

The temperature of each solution was adjusted to 30° C. whereafter the carbonate solution was slowly added over a period of 25 minutes to the mixed nitrate solution. Throughout the addition, the mixture was vigorously stirred and its temperature was maintained at 30°±2° C.

On completion of the mixing, the formed slurry was transferred to a Bushner funnel and filtered to dryness. Washing, drying, calcining and pelleting steps were then carried out as described in Example 1 except that washing was carried out at 30° C. and the drying was carried out at 30° C. for 65 hours.

The catalyst (in oxide form) thus produced was designated Catalyst I.

The preparation described above was repeated twice more except for the following differences in each case:

1. In the first case slurry was boiled in the excess carbonate solution to give a catalyst (in oxide form) designated Catalyst II 2. In the second case the was precipitate precursor was dried at 100° C. for 40 hours. This catalyst (in oxide form) was designated Catalyst III.

Each of the catalysts were reduced in hydrogen to give an activated catalyst and then separately subjected to a steam gasification test under the following conditions:

| Feedstock: | Kerosine |
| --- | --- |
| Steam/Feed Ratio: | 2:1 |
| Pressure: | 450 psig |
| Inlet Temperature: | 450° C. |
| Outlet Temperature: | 520° C. |

The performance of each catalyst shown in FIG. 1 of the accompanying drawings which is a graph showing the amount of catalyst consumed against the amount of feedstock consumed.

It will be apparent from the results plotted on the graph that Catalyst I exhibits good performance.

EXAMPLE 3

This Example is given to illustrate the performance of catalysts of the invention in comparison with commercially available catalysts for the gasification of both light and heavy gas oils.

The Catalysts

A catalyst (designated Catalyst IV) of the invention was prepared as follows:

| Chemicals used: | | |
|---|---|---|
| Nickel Nitrate, hydrate | 31.8Kg | |
| Aluminium Nitrate, hydrate | 14.2Kg | in 80 liters H$_2$O |
| Chromic Nitrate, hydrate | 1.69Kg | |
| Sodium carbonate, anhydrous | 24.4Kg | in 64 liters H$_2$O |

The nitrate solution was heated to 60° C. and the carbonate to 55° C. The carbonate was added to the nitrate, with stirring over 55 minutes. The temperature was kept at 59°–61° C.

The precipitated slurry was filtered on a rotary vacuum filter and washed by spraying with hot pure water on the filter. The cake was reslurried with pure water to make 180 liters and heated to 60° C. The filtration/washing was then repeated. In all the catalyst was filtered six times.

After the final filtration the catalyst was dried at 125° C. and calcined at 450° C. The calcined catalyst was crushed, mixed with 2% by weight graphite; and pelleted to ⅛"×⅛" cylinders.

Composition of the catalyst:

| Nickel | 58.1% |
|---|---|
| Alumina | 17.5% |
| Chromium | 1.9% |
| Sodium | 0.01% |

Gasification Tests

Figure 2:
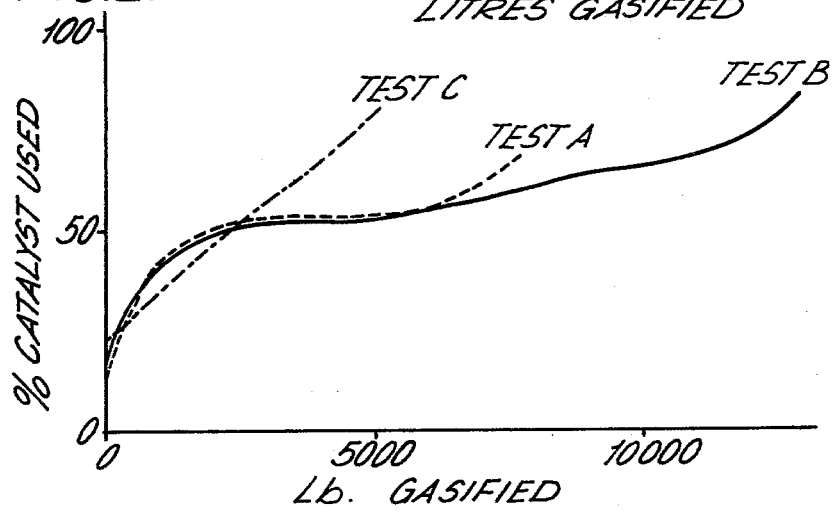
FIG. 2 shows the relationship of the amount of catalyst consumed vs. the amount of various hydrocarbon feedstocks gasified using various catalysts, including catalysts in accordance with the present invention.

Catalyst IV was compared with commercially available low alkali nickel-alumina coprecipitated catalysts designated X in gas oil gasification tests and the performances shown in FIG. 2 of the accompanying drawings, which is a graph showing the amount of catalyst consumed against the amount of feedstock gasified.

The conditions for each test are summarized in the following Table. The light gas oil (lgo) feedstock was a Conoco Gas Oil of boiling range 184°–341° C. and the heavy gas oil (hgo) feedstock was a Shell Moerdijk oil of boiling range 184°–362° C.

| Test | A | B | C |
|---|---|---|---|
| Feedstock | lgo | hgo | lgo |
| Catalyst | IV | IV | X |
| Pressure (psig) | 650 | 650 | 620 |
| Preheat Temp (°C.) | 555 | 555* | 550** |
| Max. Temp (°C.) | 580 | 580 | 610 |
| Steam/Feed Ratio | 2.2 | 2.2 | 2.2–3.0 |

*The preheat temperature was raised to 565° C. then to 575° C. during the test.
**The preheat temperature was raised to 560° C. when the steam feed ratio was altered to 3:1.

We claim:

1. A catalyst precursor for use in the steam reforming of hydrocarbons which consists of a calcined form of a coprecipitated basic carbonate of the empirical formula $$Ni_aAl_bCr(III)_cCO_3(OH)_{16}xH_2O$$

wherein
a = 4–6.4,
b/c = 3–19:1,
2a + 3b + 3c = 18 and
x = 3.5–5.5; and wherein at least 55% by volume of the pores therein having a pore radius of from 12–120 Å have a pore radius in the range of from 12–30 Å.

2. A catalyst precursor as claimed in claim 1, wherein the ratio of b/c equals about 9:1.

3. A catalyst precursor as claimed in claim 1, wherein sodium and/or potassium are present in amounts not exceeding 0.01% by weight and 0.4% by weight, respectively.

4. A process for preparing a catalyst for use in the steam reforming of hydrocarbons, said process consisting of
precipitating a basic carbonate from an aqueous solution of an alkali carbonate and a mixture of water-soluble compounds of nickel, aluminum and chromium (III), said basic carbonate having the empirical formula $$Ni_aAl_bCr(III)_cCO_3(OH)_{16}xH_2O$$

wherein
a = 4–6.4,
b/c = 3–19:1, 2a + 3b + 3c = 18 and
x = 3.5–5.5;

drying said precipitate;
calcining said dried precipitate, said calcined precipitate having at least 55% by volume of the pores therein having a pore radium of from 12–120 Å have a pore radius in the range of from 12–30 Å; and
contacting said calcined precipitate with hydrogen at a temperature sufficient to reduce said calcined precipitate.

5. A process as claimed in claim 4, wherein said precipitation step is carried out at a temperature of not more than 60° C.

6. A process as claimed in claim 4, wherein said precipitation step is effected by adding said alkali carbonate to said aqueous solution containing the nickel, aluminum and chromium (III) compounds.

7. A process as claimed in claim 4, wherein said precipitation step is carried out at constant temperature.

8. A process as claimed in claim 4, wherein said drying step is carried out at substantially the same temperature as the temperature employed during said precipitation step.

9. A process as claimed in claim 4 wherein said alkali carbonate is selected from the group consisting of sodium carbonate and potassium carbonate.

10. A process as claimed in claim 4 wherein said water-soluble compounds of nickel, aluminum and chromium (III) are, respectively, nickel nitrate, aluminum nitrate and chromium (III) nitrate.

11. A process for the production of methane-containing gases which comprises
contacting a catalyst precursor which consists of a calcined form of a coprecipitated basic carbonate of the empirical formula $Ni_aAl_bCr(III)_cCO_3(OH)_{16}xH_2O$ wherein
a=4–6.4,
b/c=3–19.1,
2a+3b+3c=18 and
x=3.5–55, with hydrogen at a temperature sufficient to reduce said calcined catalyst precursor, said catalyst precursor thus being formed into a catalyst bed; and passing a vapor of a hydrocarbon feedstock having a boiling point of not more than about 360° C. and steam over said catalyst bed to form said methane-containing gases, the temperature of said catalyst bed being maintained at from 350° 650° C. where first contacted by said vapor, the temperature of the remainder of said catalyst bed being maintained by catalyzed vapor reactions at at least 450° C.

12. A process as claimed in claim 11, wherein said hydrocarbon feedstock is naphtha, kerosene, light gas oil or heavy gas oil.

13. A process as claimed in claim 11, wherein the steam to hydrocarbon feedstock ratio is at least 1.5:1 (w/w).

14. A catalyst for use in the steam reforming of hydrocarbons which is formed by the steps consisting of coprecipitating a basic carbonate from an aqueous solution of water-soluble compounds of nickel, aluminum and chromium (III) by adding an alkali carbonate precipitant thereto, said basic carbonate having the empirical formula $Ni_aAl_bCr(III)_cCO_3(OH)_{16}xH_2O$ wherein
a=4–6.4,
b/c=3–19:1,
2a+3b+3c=18 and
x=3.5–5.5;

drying said precipitate consisting solely of said basic carbonate;

calcining said dried precipitate, said calcined precipitate having at least 55% by volume of the pores therein having a pore radius of from 12–120 Å have a pore radius in the range of from 12–30 Å; and contacting said calcined precipitate with hydrogen gas at a temperature sufficient to reduce said calcined precipitate.

\* \* \* \* \*